M. J. WOHL.
DIFFUSING SCREEN.
APPLICATION FILED APR. 18, 1916.
1,202,945.
Patented Oct. 31, 1916.
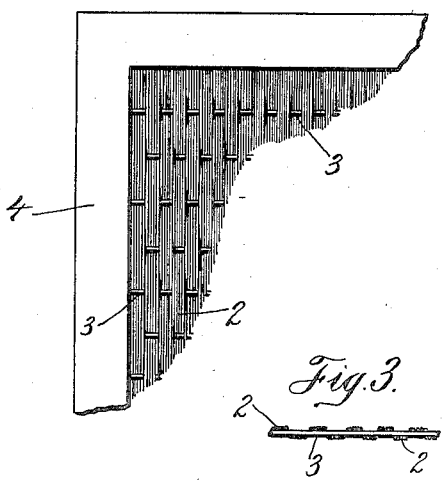
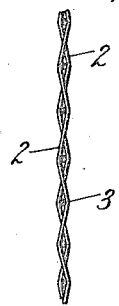
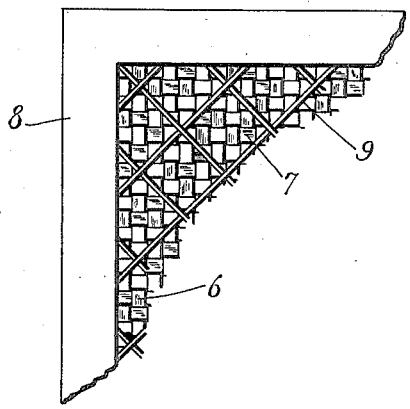
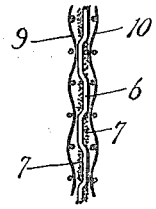
WITNESS
Alex Currie
INVENTOR.
Maurice J. Wohl,
BY
Lewis J. Doolittle
ATTORNEY.

UNITED STATES PATENT OFFICE.

MAURICE J. WOHL, OF NEW YORK, N. Y.

DIFFUSING-SCREEN.

1,202,945.

Specification of Letters Patent.

Patented Oct. 31, 1916.

Application filed April 18, 1916. Serial No. 91,869.

*To all whom it may concern:*

Be it known that I, MAURICE J. WOHL, a citizen of the United States, and resident of Brooklyn, city of New York, county of Kings, and State of New York, have invented certain new and useful Improvements in Diffusing-Screens, of which the following is a specification.

This invention relates to a screen adapted for use as a light diffusing device to cause the rays of light to be diffused as they pass therethrough, the invention being designed for use in connection with the lighting apparatus for cameras or motion picture machines, and for other purposes.

Light diffusing screens constructed according to this invention are particularly useful in connection with the lights used in photographic apparatus generally, although they may be employed with advantage in other arts and for other purposes.

The invention has for an object the provision of a screen for the diffusion of light which is characterized by better diffusing qualities and by less actinic light absorption.

A further object is to provide a light diffusing screen having mechanical strength and heat resisting qualities which render the same less liable to damage by the heat of the lamps.

For further comprehension of the invention, and of the objects and advantages therein, reference will be had to the following description and accompanying drawings, and to the appended claims in which the novel features of the invention are more particularly set forth.

Figure 1 of the drawings is a face view of a portion of a screen embodying the invention. Fig. 2 is a sectional view of a portion of the light diffusing fabric. Fig. 3 is a sectional view of a portion of the fabric at right angles to that shown in Fig. 2. Fig. 4 is a similar view to Fig. 1, illustrating a modified embodiment of the invention. Fig. 5 is an enlarged sectional view, similar to Fig. 2, of the modified construction shown in Fig. 4. Referring now to Figs. 1 to 3, the light diffusing fabric therein disclosed comprises a sheet made of fine spun strands 2 of non-combustible and translucent material, in this instance glass, preferably disposed in parallel relation to each other, without being interwoven or twisted together; and which are supported and retained in position by the spaced metallic cross wires 3 which are woven into the sheet. These wires serve to strengthen and stiffen the fabric to permit of it being secured in a suitable holding frame, a portion of which is indicated at 4, whereby it may be mounted in any desired light projection apparatus. When the light is to be considerably softened several superimposed layers of the light diffusing fabric may be employed in the screen.

In the modification shown in Figs. 4 and 5 the light diffusing fabric is made up of vertical and horizontal strands, 6 and 7 respectively, of spun glass which are woven together into a fabric, these strands being woven in groups arranged in braid like formation, each braid preferably comprising a number of strands laid side by side without being interwoven or twisted together. The reinforcement for this diffusing fabric whereby it is supported in a screen frame, a portion of which is shown at 8, is provided by the woven wire screens 9 and 10 on opposite sides of the fabric and between which the fabric is placed.

In view of the nature and construction of the screen the same is porous and will permit of the passage of air therethrough, which assists in ventilating the lamps, which advantage is obtained while still retaining the light diffusing qualities and non-combustibility of the screen. This screen eliminates the disadvantage inherent in solid ground glass screens, which are liable to break and will not withstand the heat from the lamps and which, if made of sufficient thickness to provide the necessary heat resisting qualities, effect considerable absorption of light, and particularly of the actinic rays.

My improved diffusing screen may be made much thinner than a ground glass screen, without any increased liability to damage from the heat of the lamps, with a consequent reduction both of expense of manufacture and of the weight of the apparatus, while by reason of the nature and construction of the screen and the metallic reinforcement thereof, liability to fracture or damage during handling is reduced.

What I claim is:

1. A light diffusing screen comprising, in combination, a supporting member composed of a frame having transverse reinforcing members rigidly attached to said frame, a plurality of strands of spun glass positioned in and attached to said frame extending transversely to said reinforcing members and supported in a relatively rigid position thereby.

2. A light diffusing screen comprising a woven fabric of a translucent and non-combustible material, and independent wire supports extending across both faces of said fabric, and a frame in which said fabric and wire supports are mounted.

3. A light diffusing screen comprising a sheet composed of strands of spun glass, a wire reinforcement extending across the said strands, and a supporting frame having the said wire reinforcement attached thereto on two opposing sides of the frame and the strands attached thereto on the other two opposing sides of the frame.

Signed at city, county and State of New York, this 27th day of March, 1916.

MAURICE J. WOHL.